Patented Nov. 17, 1953

2,659,658

UNITED STATES PATENT OFFICE 2,659,658

PROCESS OF PRODUCING METAL FLUORIDES

William A. La Lande, Jr., Plymouth Meeting, and Isadore Mockrin, Philadelphia, Pa., assignors to The Pennsylvania Salt Manufacturing Company, Philadelphia, Pa., a corporation of Pennsylvania No Drawing. Application August 30, 1952, Serial No. 307,378

15 Claims. (Cl. 23—88)

The present invention relates to metal fluorides, both simple and complex, and the manufacture thereof.

It is always desirable in the production of chemicals that the product obtained be in a form easily separated from the other products of the reaction, and that the reaction be carried out in such a manner that it goes substantially to completion, thus giving a high yield of the desired product.

We have now discovered that both complex and simple metal fluorides can be readily prepared in a form easily separated from the other products of the reaction and a substantial saving in reaction space and time realized if the metal, the fluoride of which is desired, is reacted in the form of its sulfate with an alkali metal fluosilicate. Despite the fact that the fluosilicates are used in preparing the metal fluorides, when the reactions are carried out in accordance with the present invention, the final product is found to be substantially free from silica. The use of other complex fluorides (such as calcium fluosilicate, the alkali metal fluoborates and the alkali metal fluoferrates) in place of the alkali metal fluosilicate is unsatisfactory for practicing the process of the present invention.

The process of the present invention is particularly useful in the preparation of synthetic cryolite, synthetic chiolite and aluminum fluoride where the reaction is carried out between sodium fluosilicate and aluminum sulfate. The production of synthetic cryolite, synthetic chiolite and aluminum fluoride by this method is claimed in our copending application, Serial No. 307,377.

In preparing metal fluorides in accordance with the present invention, the alkali metal fluosilicate and the metal sulfate (the metal being a metal other than an alkali metal) are mixed together in a substantially dry powdered form, preferably by grinding, and then heated in a substantially dry atmosphere. The amount of heat required will depend to some degree on the reactants used; it is preferred to carry out the reactions at temperatures at which liquefaction does not occur. Liquefaction will result in corrosion, difficulty in removing the reacted mass and necessitate grinding before separating the products. It has been found that the reactions in general will occur in a temperature range of 200° to 700° C., the preferred temperature generally being the lowest at which a reasonably rapid reaction is obtained. For example, in making the magnesium fluorides, the temperature range generally used is 450° C. to 650° C.; whereas for lead-fluorine compounds and iron-fluorine compounds, temperatures in the respective ranges of 500° to 700° C. and 350° to 450° C. are generally used.

After completion of the reaction, the solid reaction products are washed with water, for example, by slurrying. The desired metal fluoride is separated out in substantially pure form as an insoluble material which is then dried. The other products of the reaction are a water-soluble salt and a gas.

Whether the metal fluoride product is a simple metal fluoride or a complex metal fluoride will depend on the molar ratios of the reactants employed. For example, if 1 mole of sodium fluosilicate is heated together with 1 mole of magnesium sulfate at a temperature of 450° to 650° C. in a substantially dry atmosphere, the metal fluoride product is magnesium fluoride. However, if 3 moles of sodium fluosilicate are heated together with 2 moles of magnesium sulfate at a temperature of 450° to 650° C., sodium magnesium fluoride is formed.

In the production of these materials, it is probable that the following reactions occur:

(1) $Na_2SiF_6 + MgSO_4 \rightarrow MgF_2 + Na_2SO_4 + SiF_4$ (2)
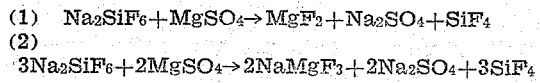
$3Na_2SiF_6 + 2MgSO_4 \rightarrow 2NaMgF_3 + 2Na_2SO_4 + 3SiF_4$ It will be noted that the reaction products in each case are the relatively water-insoluble metal fluoride, the readily water-soluble sulfate and the gas $SiF_4$. The metal fluoride product is thus readily separated from the reaction product by a water treatment. Also, the volatile silicon tetrafluoride can be reacted with the soluble sulfate and give the starting alkali fluosilicate which then can be returned to the reaction. Since fluorine and fluorine chemicals are relatively expensive, this complete use of the fluorine is an important factor in any commercial practice of the invention.

The reactions of the present invention can frequently be accelerated by passing a gas, inert to the reaction, over the reactants and/or by grinding the reactants during the course of the reaction. Where the reactants are swept by a gas during the reaction, the gas should preferably be at a velocity of at least 5 milliliters per minute per square centimeter of cross-sectional area of reactor.

In order to better illustrate the practice of the present invention, the following examples are given. These examples are given by way of illustration only and should not be considered as limiting the invention to the preparation of the specific compounds illustrated. In the examples and throughout the specification and claims where the term "parts" is used, the parts are parts by weight.

Example 1

In preparing magnesium fluoride ($MgF_2$) ten parts of a mixture of sodium fluosilicate (6.09 parts) and magnesium sulfate (3.91 parts) in stoichiometric proportions were ground in a porcelain mortar for two minutes and then heated to constant weight at 550° C. in a covered platinum crucible. No further change in weight resulted from heating for an additional two hours the product obtained from a two and one-quarter hour heating period. The weight loss was 33.4% which agrees well with the calculated silicon tetrafluoride loss of 33.7%.

A 5.00 gram sample of the cooled product was separated into an insoluble (magnesium fluoride) and a soluble fraction (sodium sulfate) by water extraction, the magnesium fluoride being dried at 110° C. The yields were:

|  | Found | Calculated |
|---|---|---|
|  | Grams | Grams |
| $MgF_2$ | 1.53 | 1.52 |
| $Na_2SO_4$ | 3.44 | 3.48 |

The magnesium fluoride was analyzed with the following results:

|  | Found | Calculated |
|---|---|---|
|  | Percent | Percent |
| F | 59.6 | 61.0 |
| Total Si as $SiO_2$ | 1.6 |  |

Example 2

In the preparation of lithium fluoaluminate ($Li_3AlF_6$), ten parts of a ground mixture of lithium fluosilicate (7.32 parts) and aluminum sulfate (2.68 parts) in stoichiometric proportions were heated to constant weight in a covered platinum crucible at 400° C. No further weight change resulted from heating for an additional hour the product obtained from a one and one-half hour heating period. The actual weight loss was the same as the calculated loss, 49.0%.

A 2.50 gram sample of the cooled product was separated into insoluble (lithium fluoaluminate) and soluble (lithium sulfate) fractions by water extraction. The lithium fluoaluminate was dried at 110° C., as was the sodium sulfate, after evaporation of the filtrate to dryness. The yields of the lithium fluoaluminate and the sodium sulfate, on analysis, were found to be substantially the same as the theoretical.

Example 3

Calcium fluoride ($CaF_2$) was prepared in the following manner: Calcium sulfate "still residue" obtained from the production of hydrogen fluoride via the reaction $CaF_2+H_2SO_4 \rightarrow 2HF+CaSO_4$, was ignited to constant weight at 600° C. The calcium sulfate contained about 1.5% of calcium fluoride.

Ten parts of a mixture of sodium fluosilicate (5.80 parts) and ignited calcium sulfate (4.20 parts) were heated to constant weight in three and one-half hours. The actual weight loss was 32.1% and the calculated loss, based on sodium fluosilicate, was 32.2%. Calcium fluoride and sodium sulfate were identified in the product mixture by means of X-ray diffraction patterns.

Five grams of the cooled product were separated into insoluble (calcium fluoride) and soluble (sodium sulfate) fractions by water extraction. The calcium fluoride and sodium sulfate, after evaporation to dryness, were dried at 110° C. The yields were:

|  | Found | Calculated |
|---|---|---|
|  | Grams | Grams |
| $CaF_2$ | 1.77 | 1.78 |
| $Na_2SO_4$ | 3.21 | 3.22 |

Example 4

In preparing lead fluoride a substantially dry mixture containing equal molar proportions of sodium fluosilicate and lead sulfate was heated to a temperature of 500° to 700° C. until the reaction was complete as indicated by the cessation of elimination of silicon tetrafluoride gas. The resulting lead fluoride was then separated by water extraction the lead fluoride being substantially water insoluble.

Example 5

A substantially dry mixture of sodium fluosilicate and iron sulfate was prepared containing 3 to 6 mols sodium fluosilicate per mol iron sulfate. This mixture was then heated at a temperature of 350° to 450° until no further gas evolution was noted. The iron fluoride was then extracted from the resulting reaction product by water digestion the iron fluoride being substantially water insoluble.

Though any of the alkali metal fluosilicates can be used in practicing our present invention, we prefer to use the sodium, potassium and lithium fluosilicates. Also, though any metal (other than an alkali metal) sulfate can be used, the process is found to be most suitable for the preparation of the fluorides of the metals aluminum, magnesium, calcium, strontium, barium, lead, zinc, antimony, iron, cobalt and nickel.

In our co-pending application Serial No. 370,227, filed July 24, 1953, which is a continuation in part of the present application, the use of the metal chlorides, phosphates and borates, in a somewhat similar process for preparing metal fluorides, is described and claimed.

Having thus described our invention, we claim:

1. The method of making metal fluorides comprising preparing a substantially dry mixture of an alkali metal fluosilicate with a metal sulfate wherein the metal is a metal other than an alkali metal and heating said mixture to a temperature of at least 200° C., but below that at which the mixture melts, until the reaction is substantially complete as indicated by substantially complete cessation of evolution of $SiF_4$ gas.

2. The method of claim 1 wherein the alkali metal fluosilicate is one of the group consisting of sodium potassium and lithium.

3. The method of making metal fluorides comprising preparing a substantially dry mixture of an alkali metal fluosilicate with a metal sulfate wherein the metal of said sulfate being selected from the group consisting of aluminum, magnesium, calcium, strontium, barium, lead, zinc, antimony, iron, cobalt and nickel, and heating said mixture to a temperature of at least 200° C., but below that at which the mixture melts, until the reaction is substantially complete as indicated by substantially complete cessation of evolution of $SiF_4$ gas.

4. The method of claim 3 wherein the metal salt is iron sulfate.

5. The method of claim 3 wherein the metal salt is magnesium sulfate.

6. The method of claim 3 wherein the metal salt is lead sulfate.

7. The method of claim 3 wherein the metal salt is strontium sulfate.

8. The method of claim 3 wherein the metal salt is zinc sulfate.

9. The method of claim 1 wherein the reactants, during the course of the reaction, are swept with a gas inert to the reaction.

10. The method of claim 1 wherein the reactants are ground before completion of the reaction and after initiation thereof.

11. The method of claim 1 wherein the solid reaction products are washed with water to separate out the metal fluoride product.

12. The process of making magnesium fluoride comprising heating to a temperature of 450° to 650° C., but below that at which the mixture melts, in a substantially dry atmosphere, a substantially dry mixture of sodium fluosilicate and magnesium sulfate in the molar proportions of 1 mole sodium fluosilicate per mole magnesium sulfate, and maintaining the mixture at said temperature until the reaction is substantially complete as indicated by substantially complete cessation of evolution of $SiF_4$ gas.

13. The process of making sodium magnesium fluoride comprising heating to a temperature of 450° to 650° C., but below that at which the mixture melts, in a substantially dry atmosphere, a substantially dry mixture of sodium fluosilicate and magnesium sulfate in the molar proportions of 1.5 to 2 moles sodium fluosilicate per mole magnesium sulfate, and maintaining the mixture at said temperature until the reaction is substantially complete as indicated by substantially complete cessation of evolution of $SiF_4$ gas.

14. The process of making lead fluoride comprising heating to a temperature of 500° to 700° C., but below that at which the mixture melts, in a substantially dry atmosphere, a substantially dry mixture of sodium fluosilicate and lead sulfate in the molar proportions of 1 mole sodium fluosilicate per mole lead sulfate, and maintaining the mixture at said temperature until the reaction is substantially complete as indicated by substantially complete cessation of evolution of $SiF_4$ gas.

15. The process of making iron fluoride comprising heating to a temperature of 350° to 450° C., but below that at which the mixture melts, in a substantially dry atmosphere, a substantially dry mixture of sodium fluosilicate and iron sulfate in the molar proportions of 3 to 6 mols sodium fluosilicate per mol iron sulfate, and maintaining the mixture at said temperature until the reaction is substantially complete as indicated by substantially complete cessation of evolution of $SiF_4$ gas.

WILLIAM A. LA LANDE, JR.
ISADORE MOCKRIN.

No references cited.